United States Patent [19]

Curtze et al.

[11] Patent Number: 4,543,283
[45] Date of Patent: Sep. 24, 1985

[54] ENCAPSULATED GLAZING PRODUCT

[75] Inventors: Edward W. Curtze, Perrysburg, Ohio; Siegfried H. Herliczek, Petersburg, Mich.

[73] Assignee: Libbey-Owens-Ford Company, Toledo, Ohio

[21] Appl. No.: 646,942

[22] Filed: Sep. 4, 1984

[51] Int. Cl.⁴ .............................................. B32B 3/02
[52] U.S. Cl. .................................... 428/38; 156/104; 156/107; 428/83; 428/192
[58] Field of Search ............... 156/102, 104, 105, 106, 156/107; 428/38, 83, 192

[56] References Cited

U.S. PATENT DOCUMENTS

| 3,231,461 | 1/1966 | Mattimoe | 428/437 |
| 3,281,296 | 10/1966 | Jameson | 428/83 |
| 3,806,387 | 4/1974 | Peetz et al. | 156/102 |
| 3,806,400 | 4/1974 | Laethem | 156/102 |
| 3,979,548 | 9/1976 | Schäfer et al. | 428/38 |
| 4,227,950 | 10/1980 | Spycher | 156/106 |
| 4,242,403 | 12/1980 | Mattimoe et al. | 428/437 |

Primary Examiner—William J. Van Balen
Attorney, Agent, or Firm—Phillip S. Oberlin

[57] ABSTRACT

A glazing unit comprised of a glass substrate and a laceration inhibiting shield supported by and extending over what would otherwise be an exposed surface of the substrate. A gasket or frame member composed of a synthetic polymer extends around a major portion of the periphery of the glass substrate and shield and is adhered to the marginal edge surfaces of each, such gasket having been polymerized in situ adjacent the said periphery and having assumed through the autogenous mechanism incident to its polymerization and cure, while confined intimate contact with the portions to which it is adhered.

17 Claims, 5 Drawing Figures

ENCAPSULATED GLAZING PRODUCT

BACKGROUND OF THE INVENTION

The present invention relates generally to an encapsulated glazing product including a glass substrate having a layer of plastic material secured thereto and presenting an exposed surface, and a polymeric frame member surrounding a major portion of the peripheral regions of the glass and plastic layer assembly.

In the early stages of the automobile industry, single sheets of ordinary or annealed glass were employed as windshields. As it became evident that this type of windshield presented a considerable safety hazard, the single sheets of annealed glass were replaced with single sheets of heat treated or tempered glass. Thereafter, as laminated safety glass was developed to reduce the severity of lacerative injuries, its use in automobile windshields greatly increased until today, when almost all automotive windshields are constructed of some type of laminated glass. However, the use of laminated glazing structures in all of the openings of automotive vehicles, besides being very costly, can substantially add to the weight of the vehicle thereby adversely affecting fuel economies which are of great importance at the present time. Therefore, with a mind for developing as safe a vehicle as possible within acceptable weight parameters, attention has been given to developing anti-lacerative glazing structures for automotive vehicles. The major thrust of the present invention is directed to glazing structures for use in vehicles which structures have inherent safety characteristics and are nevertheless of a reduced overall weight. It is felt to be advantageous to retrace the history of vehicular glazing structures which are hereinafter briefly addressed.

Today, typically, an assembly of laminated glass of the type utilized in vehicle windshields consists of two sheets of glass bonded together with a thin plastic interlayer, such as a sheet polyvinyl butyral, for example. In the event of an impact on a laminated glass windshield sufficient to break the glass, the plastic interlayer functions to bind the glass fragments together, thus reducing the risk of injury to a driver or passenger as a result of flying glass or contact with the windshield. Further developments with this type of laminated glass, such as those disclosed in U.S. Pat. No. 3,231,461, have resulted in laminated windshields with improved penetration resistance. Consequently, in view of the ever growing recognition of the necessity for increased safety precautions, continuing efforts have been and are still being made to appreciably reduce the injury producing potential of an automobile windshield.

Recently, it has been found that the addition of a second plastic layer bonded to the exposed surface of the inboard glass sheet of the laminated windshield further increases the safety effectiveness of the windshield. The second plastic layer has typically been termed a protective laceration inhibiting shield since it has been found that the additional plastic layer will appreciably reduce the number and severity of lacerative injuries to persons thrown against the windshield under all impact conditions. Further, it has been found that the laceration shield when produced under certain conditions of manufacture improves the ability of the laminated windshield to decelerate the movement of a person thrown against the windshield, while also increasing the penetration resistance of the windshield as compared to conventional laminated windshields. Also, the laceration shield reduces the amount of flying glass and, thus, the injury to occupants as a result of objects that may be thrown against the windshield from overpasses or elsewhere outside the vehicle.

An example of an automotive windshield which incorporates, as part of its laminated structure, a protective laceration shield bonded to its inboard glass surface is disclosed in U.S. Pat. No. 4,242,403. In this patent, the laceration shield includes a penetration resisting multi-layer body consisting of an inner layer of relatively soft, extensible plastic material such as polyvinyl butyral, for example, which is adhered to the inboard surface of the windshield, an intermediate layer of more durable plastic such as a polyester, and an outer coating of an abrasion resistant material.

It will be understood that an unlaminated glass sheet could be provided in thickness sufficient to preclude shattering. However, such a glass product would not be acceptable to the automotive industry because it would result in a part employing too much weight.

While automotive safety standards in the United States require laminated structures for windshields, side lights and backlights may be fabricated of single glass sheets which are tempered. Since, in a rather substantial number of vehicle collisions, occupants are caused to be propelled through side lights, continued attention must also be given to the safety considerations of the construction of side light and back light structures.

It has been found that a thinner glass part may be produced from a combination of a sheet of glass and a plastic layer to provide a lighter weight product having acceptable scratch and shatter resistance properties. Assuming that the appropriate bonding is achieved between the glass and plastic sheet, the product will shatter in many small pieces of glass, a larger portion of which will tend to cling to the plastic with obvious safety effects.

An important aspect of the design of a glass-plastic product for use in the automotive industry is the manner in which such products absorb energy upon the impact of the type experienced during an automobile collision. It is a desideratum of the designers to develop a structure for use in vehicular applications which will absorb the energy upon impact on a curve which minimizes injury to automobile occupants.

It has been found that one method for applying a plastic layer to one surface of a single sheet of glass is disclosed in U.S. Pat. No. 3,806,387. In this method, a sheet of glass, a layer of adhesive, and a layer of thin transparent plastic sheeting are assembled in a stack to produce a laminated assembly. A second sheet of forming glass conforming to the configuration of the sheet of glass in the laminated assembly is then placed on top of the plastic sheet. The surface of the glass forming sheet which is placed adjacent to the plastic sheet is coated with a demolding agent to prevent any adhesion between the glass forming sheet and the plastic sheet. Next, the spaces between the individual lamina are evacuated and the laminated assembly is positioned in an autoclave. The autoclave applies pressure to the exterior surfaces of the laminated assembly while heating the assembly to a temperature which causes bonding between the glass sheet and the plastic sheet. After the assembly is removed from the autoclave, the forming sheet can be removed from the stack.

The structures and methods of producing the structures of the prior art have failed to fully contemplate the necessity for producing anti-lacerative glazing structures which can be used in side light, back light and sun roof applications as well as for windshield applications.

The present invention contemplates an anti-lacerative glazing structure and method of producing the same which cooperate to increase the safety levels of vehicular glazings within acceptable economic and weight parameters.

SUMMARY OF THE INVENTION

A complete multi-layer glazing unit as contemplated by this invention includes, essentially, a glass substrate, and a laceration inhibiting shield supported by and extending over what would otherwise be an exposed surface of the substrate. The glass substrate may take such varied forms as the conventional laminated safety glass structures currently required in automobile windshields in this country, the single sheet heat strengthened or tempered glass glazing commonly employed in automobile side lights, back lights and sun roofs, or an annealed glass sheet. A gasket or frame member composed of a synthetic polymer extends around a major portion of the periphery of the glass substrate and shield and is adhered to the marginal edge surfaces of each, such gasket having been polymerized in situ adjacent such periphery and having assumed through the autogenous mechanism incident to its polymerization and cure, while confined, intimate contact with the portions to which it is adhered.

An object of the invention is to produce an anti-lacerative glazing structure for use in side light, back light and sun roof, as well as windshield, applications in the vehicular industry.

Another object of the invention is to produce an anti-lacerative structure which embodies inherent physical characteristics able to rapidly dissipate the energy of an article impacting a relatively small area of the structure throughout the entire area of the product.

Another object of the invention is to produce an anti-lacerative structure for vehicular use having a polymeric frame formed in situ which encapsulates the peripheral portions of the structure.

BRIEF DESCRIPTION OF THE DRAWINGS

The above as well as other objects of the invention will become apparent to one skilled in the art from reading the following detailed description of a preferred embodiment of the invention when considered in the light of the attached drawings, in which.

DESCRIPTION OF THE PREFERRED EMBODIMENT

Figure 1:
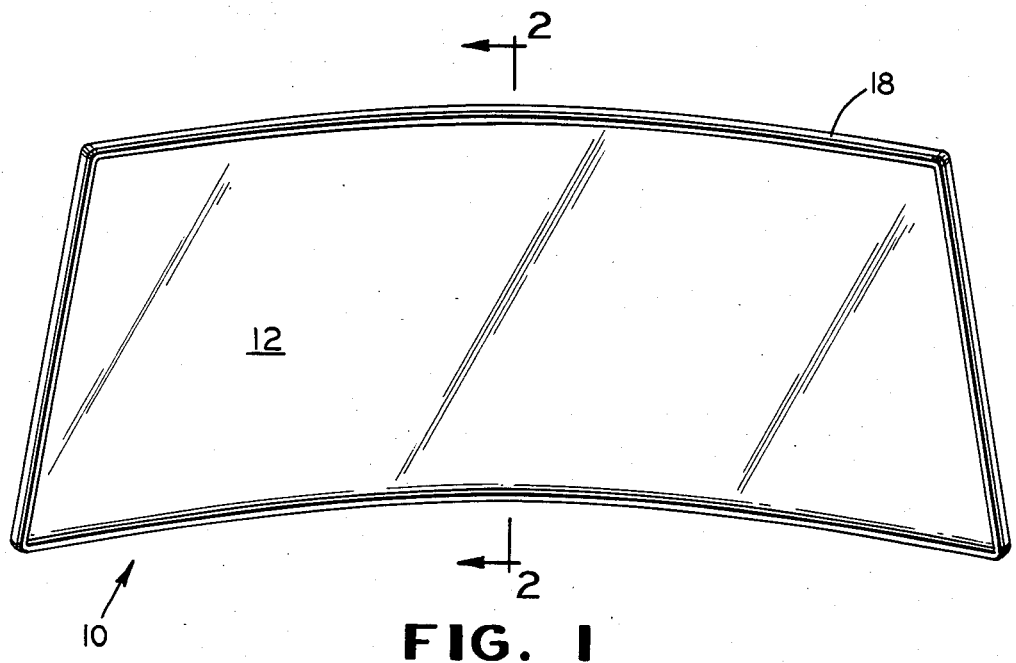
FIG. 1 is a perspective view of an anti-lacerative automotive windshield assembly embodying the features of the invention.

It should be noted at the outset of this description that, while the embodiment of the invention illustrated in the drawings and described herein concerns an anti-lacerative windshield assembly consisting of a single sheet of glass, it will be appreciated that the invention can be readily incorporated in an anti-lacerative windshield consisting of a laminated composite employing two or more sheets of glass. Also, while the preferred embodiment of the invention is described as a vehicle windshield, it will be appreciated that the assembly may also be advantageously employed as a side light or a rear light for vehicular use. Further, it will be understood that the glass sheet material can also be replaced by plastic sheet material to evolve a product having many of the same inherent advantages.

Figure 2:
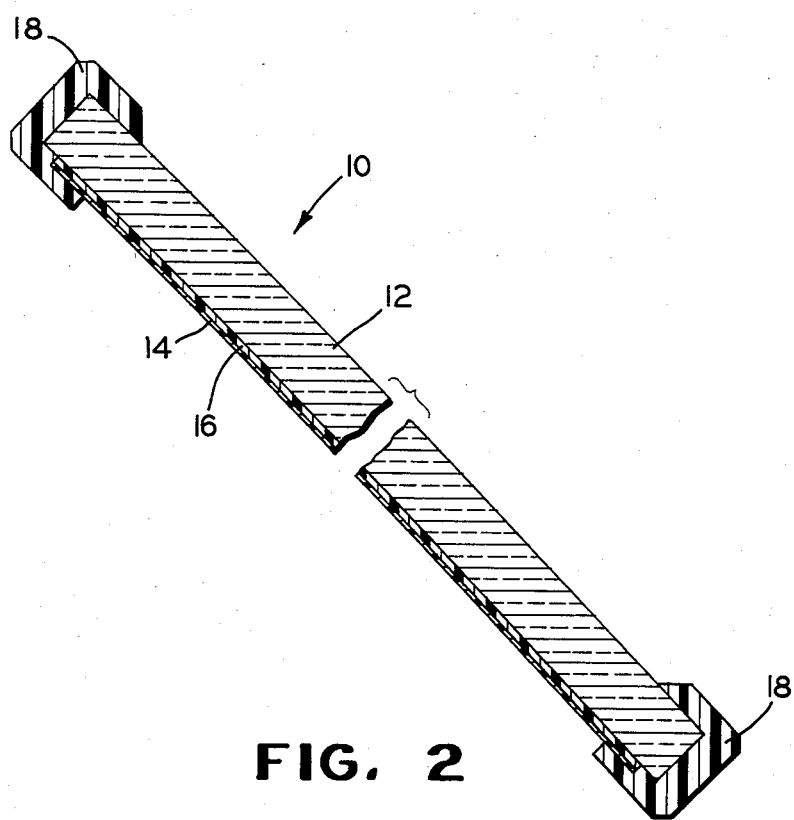
FIG. 2 is a fragmentary sectional view of the windshield assembly illustrated in FIG. 1, taken along line 2—2 thereof.

Referring to FIGS. 1 and 2, there is shown one type of anti-lacerative glass assembly useful as an automotive windshield 10 which includes a sheet of glass 12 and a plastic anti-lacerative sheet 14 secured to one surface of the glass sheet 12 by an interlayer 16 of a relatively soft extensible plastic material.

In a preferred embodiment, the glass sheet 12 has a thickness of from 0.050 inch to 0.200 inch. Typically, the soft extensible plastic layer 16 has a thickness of from 0.005 to 0.045 inch and can be formed of a polyvinyl acetal such as polyvinyl butyral, for example. The anti-lacerative layer or sheet 14, typically is formed of a thickness in the range of from 0.002 to 0.007 inch and can be formed of a polyester, for example.

Another material that may be employed as the plastic layer 16 is a scratch-resistant polyurethane, for example of the type disclosed in U.S. Pat. No. 3,979,548, which can be cast directly on a surface of the glass substrate 12 and is self-adhesive thereto or is pre-cast and then adhered to the glass through a suitable adhesive material as is well known in the art.

A frame member or gasket 18 is molded to surround the peripheral edge portions of the assembly including the glass sheet 12, the anti-lacerative layer 14, and the associated interlayer 16. The frame member 18 is typically formed of an elastomeric material which is advantageously applied by a reaction injection molding (RIM) process and, by the autogenous mechanism of the molding process, is securely affixed to the glass substrate and anti-lacerative layer.

The above described product can be readily integrally attached to the material defining the periphery or outline of a vehicle windshield opening, for example, during the manufacture of the vehicle.

It will be appreciated that the windshield assembly described above produces an extremely safe and light weight structure which may be readily and economically installed in a vehicle during the vehicle manufacture. The resultant structure exhibits rather unexpected results from a safety standpoint. It is believed that by the formation of the frame 18, as an integral part of the assembly, the plastic anti-lacerative layer 14 and the frame 18 cooperate to dissipate energy over the entire area of the assembly when impacted by a projectile such as a human being during an automobile collision. By such expeditious energy dissipation, the severity of injury, particularly head injuries, can be materially reduced. To more fully understand and appreciate the phenomenon, the assembly of the invention can be likened to a drumhead. In drumhead constructions, a membrane, such as animal hide, is stretched over the open end of a hollow cylinder and securely maintained in the stretched position by an adjustable tightening hoop or the like. The plastic layer 14 of the assembly described above is similar to the membrane of the drumhead, while the frame 18 functions in a manner similar to the drum hoop.

Accordingly, upon impact by an object against a limited area of the composite product, the energy of the impacting object is rapidly dissipated throughout the entire assembly. This is true even in the event there may be "let go's" or adhesive failures between the plastic layer 14 and the glass. In addition to its function to dissipate the impact energy, the plastic layer 14 cooperates with the frame member 18 to present a closure even in the event of glass breakage and failure of the bond between the glass and frame member, to militate against the penetration of the object completely through the assembly, and functions to assist in elastically causing the objects, once the impact energy has been absorbed, to reverse its initial direction of motion and be aided in retrograde movement.

In producing the invention described above, the glass sheet 12 is initially formed into the desired shape to conform with the opening in the sheet metal of the vehicle into which the assembly of the invention is to be applied, and then typically a plastic composite of the layer 14 and the layer 16 are applied to a previously cleaned surface of the glass sheet 12 adapted to face inwardly of the associated vehicle. A cover sheet formed of a sheet of glass having the desired high optical properties is placed against the exposed surface of the plastic layer 14 to assist in the bonding of the plastic composite to the inboard surface of the glass sheet 12. After the cover sheet has been positioned against the outer surface of the plastic layer 14, the air spaces between the individual laminae are evacuated to urge the individual laminae toward one another. This can be accomplished by utilizing an associated vacuum system which typically consists of a vacuum ring adapted to surround the peripheral edges of the assembly. The vacuum ring is attached to a source of vacuum which effectively cooperate to cause any air pockets between the individual laminae to be removed. The assembly having the vacuum ring attached is then placed in an autoclave unit designed to apply pressure to the exterior surfaces of the assembly while simultaneously heating the entire assembly to a predetermined temperature to cause the plastic interlayer 16 to bond the anti-lacerative sheet 14 to the associated inboard surface of the glass sheet 12. While in the autoclave, the vacuum ring can be connected to a source of vacuum to maintain vacuum during the bonding operation. Typically, the pressure within the autoclave is in the range of from 200 to 275 PSI while the temperature is in the range of from 250° F. to 325° F. This temperature and pressure are typically maintained for approximately twenty (20) minutes to assure an effective bonding between the individual laminae.

After the then laminated assembly has been removed from the autoclave, the associated vacuum ring is removed. Next, the associated cover sheet or cover plate can be removed from the laminated assembly and then the completed laminated assembly can be placed into the mold cavity 24 of a mold section 22 of a reaction injection molding device 20, as generally illustrated in FIGS. 3 to 5, inclusive.

Figure 3:
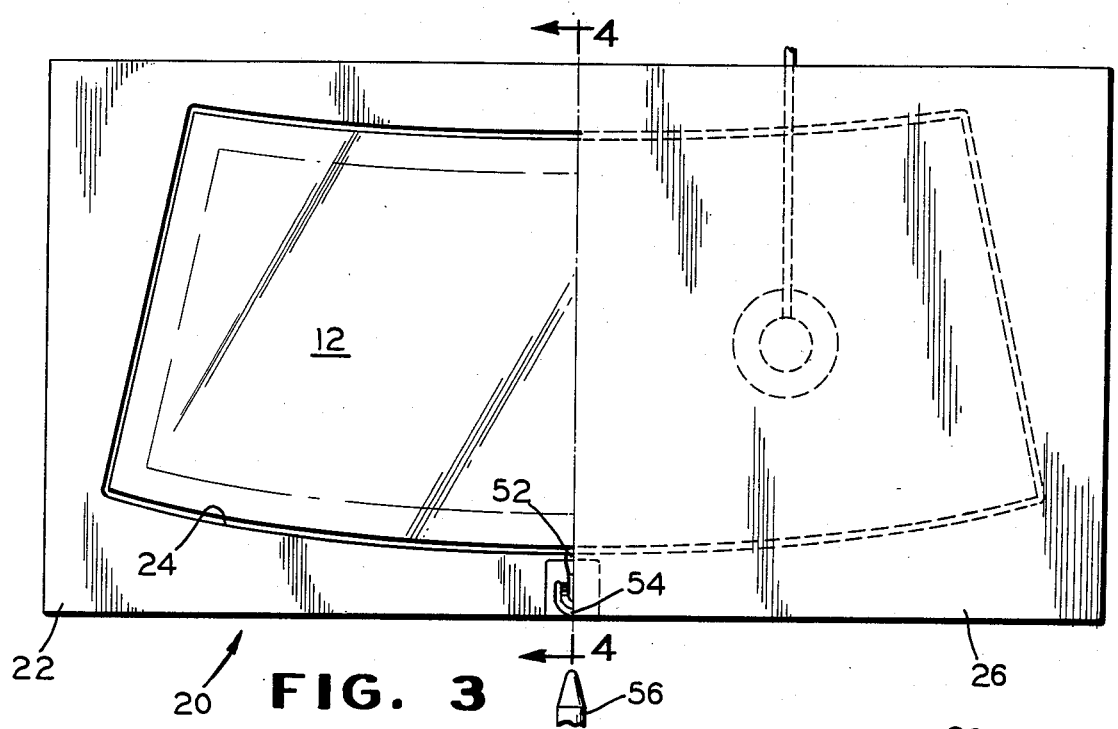
FIG. 3 is a top plan view of a mold section employed in forming the polymeric frame member on the glazing product illustrated in FIGS. 1 and 2.
Figure 4:
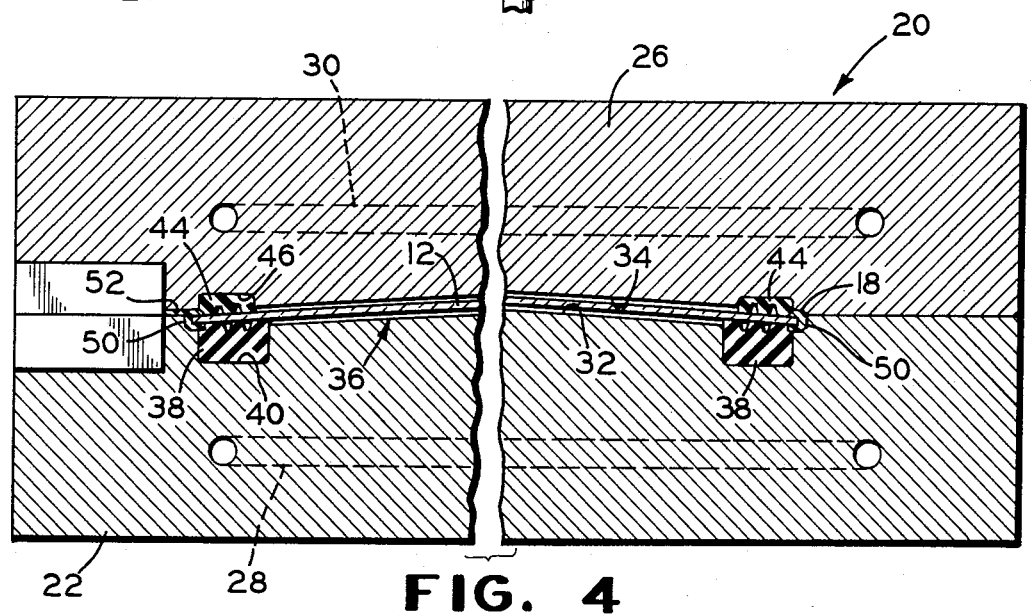
FIG. 4 is an enlarged fragmentary sectional view of the mold structure of FIG. 3 taken along line 4—4 thereof.
Figure 5:
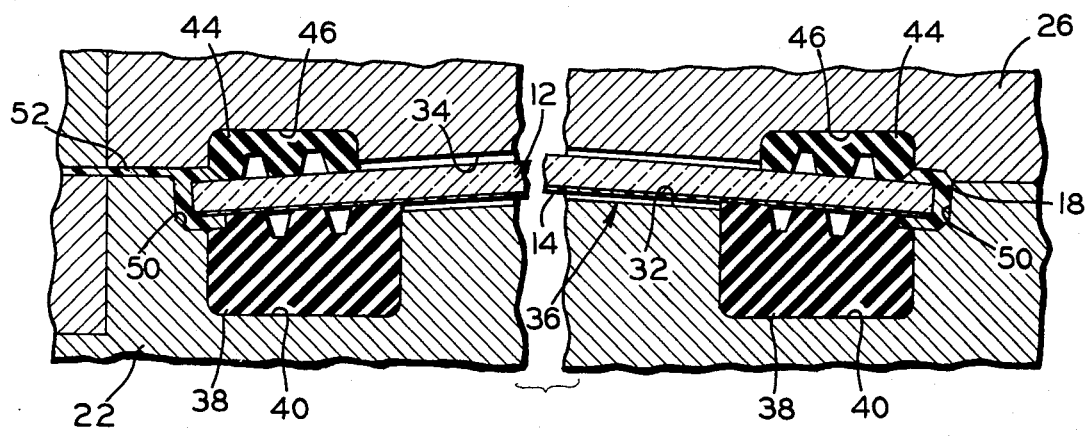
FIG. 5 is an enlarged fragmentary sectional view showing pad members for supporting a laminated structure during the production of an encapsulated windshield assembly incorporating the features of the invention.

Referring to FIGS. 3 through 5, there is shown a molding device 20 specifically adapted to form a gasket about the periphery of a laminated anti-lacerative assembly such as an automobile windshield, for example. The molding device 20 is comprised of a lower section 22 (a top plan view of which is shown in the left hand portion of FIG. 3) and an upper section 26 (a top plan view of which is shown in the right hand portion of FIG. 3). While the mold sectons 22 and 26 are typically formed of a metallic material such as steel or aluminum, for example, other types of substantially non-resilient material can be used. Suitable means, not shown, are provided to open and close the mold sections 22 and 26. Each of the mold sections 22 and 26 can be provided with passageways 28 and 30 for circulating a suitable coolant therethrough.

As shown in FIGS. 4 and 5, the mold sections 22 and 26 are provided with recessed portions 32 and 34, respectfully, in facing relationship to one another such that, when the mold sections are closed, the recessed portions 32 and 34 cooperate to define a chamber 36 for receiving a glass sheet 12 on which a gasket is to be formed. When the mold sections are open, the laminated assembly is positioned on the lower section 22 so that the outer peripheral portion of the lower surface thereof rests on a resilient lower seal 38 positioned within a groove 40 formed in the upper surface of the lower section 22. After the laminated assembly is suitably positioned on the seal 38 of the lower mold section 22, the upper mold section 26 is lowered into position to enable the outer peripheral portions of the facing surfaces of the cooperating mold sections 22 and 26 to be clamped together in metal-to-metal contact, as shown in FIG. 5. The upper mold section 26 carries a resilient upper seal 44 positioned in a groove 46 formed opposite the groove 40. The upper seal 44 cooperates with the lower seal 38 to press yieldingly against the laminated product to effectively resiliently support the laminated product within the chamber 36.

In the drawings, the chamber 36 of the molding device 20 is slightly larger than the laminated product to avoid any glass-to-metal contact between the laminated product and the metallic mold sections 22 and 26. However, it will be appreciated that the chamber 36 can be formed of any shape as long as the chamber is sufficiently large to avoid any glass-to-metal contact between the laminated product and the metallic mold sections. For example, the portions of the mold sections 22 and 26 which are below and above the central portion of the laminated product can be removed such that each mold section will be generally ring-shaped.

The seals 38 and 44 are preferably formed of a silicone rubber material and can be secured within the respective grooves 40 and 46 by means of a suitable adhesive.

In addition to resiliently supporting the laminated product within the chamber 36, the seals 38 and 44 cooperate with selected portions of the laminated product and the mold sections 22 and 26 for defining a gasket forming cavity 50 utilized to form an encapsulating gasket. The cavity 50 communicates with a gate 52 and an inlet means 54 for receiving from an associated nozzle member 56 a composition which is capable of polymerization to produce, for example, a microcellular elastomeric gasket. Typically, the gasket forming material is adapted to polymerize and cure in situ on the peripheral portion of the laminated product and the process by which it is formed is the well known reaction injection molding process.

The first step in producing the gasket 18 for the laminated windshield 10 involves thorough cleaning of the front, rear and peripheral edges of the glass sheet material 12, and the layer 14 to prepare the surfaces for adherence of the gasket 18. In this respect, in the event the layer 14 includes a polyester anti-lacerative sheet it is often desirable that an abrasion resistant coating be applied to the exposed surface thereof. If this is the case, it is preferred that this coating be removed from the areas of the polyester sheet to be covered by and adhered to the gasket prior to formation of the gasket.

The next step is applying a primer coating to at least the previously cleaned glass surfaces. Satisfactory results have been achieved by initially employing a layer of a product which is commercially available under the designation "Betaseal, Glass Primer 435.18 Commercial Grade", from Essex Chemical Company. The glass bond area is initially wiped with the primer to form the layer, which acts as a coupling agent. The primer material is a clear moisture-sensitive primer comprising gamma-aminopropyltriethoxysilane, which promotes adhesion between other Betaseal products and glass. If desired, primers of this type may also be applied to anti-lacerative sheet areas to be covered by the gasket-forming material.

Following the application of the layer above mentioned, a second primer layer is applied over the primary layer. Satisfactory results can be obtained by utilizing a product which is commercially available under the designation "Betaseal, Glass Primer 435.20 Commercial Grade", from Essex Chemical Company. This material is a blackout primer which prevents ultraviolet degradation of urethane sealants and adhesives and assists in the rapid formation of a hydrolytically stable bond between the glass and the urethane. Approximately 20 minutes after the superimposed layers have been applied, the assembly is placed in the die cavity of the mold assembly illustrated in FIGS. 3, 4, and 5, where the gasket 18 is produced as aforementioned.

It is often desirable to apply an additional coating to the outer exposed surface of the gasket 18 before the structure is installed in a vehicle. The coating can be a black urethane-based paint, such as one manufactured by PPG Industries, Inc., under the designation Purethane 700 HSE-848. The paint coating is baked at approximately 140°–150° F. for about 20-30 minutes. The coating is employed to protect exposed gasket materials from degradation which would otherwise be caused by exposure to ultraviolet radiation normally present in unfiltered sunlight.

The preformed window assembly can be installed in an appropriate vehicle opening by applying a bead of adhesive material, for example a urethane sealant such as one manufactured by the Essex Chemical Company designated as Betaseal 551.2, with water paste, to the marginal rear edge surface of the gasket member 18, positioning the assembly in alignment with the vehicle opening, and pushing the assembly into position. As the assembly is pushed into position, the adhesive bead is maintained in a compressed condition between the assembly and the mounting flange surrounding the opening. As soon as the adhesive material cures for a sufficient period, the installation is complete.

The following example constitutes the best mode presently contemplated by the inventors. It is to be construed as illustrative, and not as limiting.

EXAMPLE

The surfaces of the upper and lower mold sections 26 and 22 which surround the mold cavity between the two, when assembled, are treated with a solvent-based mold release agent which is a blend of waxes; the particular mold release agent is commercially available from Park Chemical Company under the trade designation PRC-789. The assembly to be provided with an encapsulating gasket 18 includes a clear sheet of flat glass of nominal 0.155 inch thickness. The surface of the sheet which is adapted to face the interior of the vehicle in which it is to be glazed, i.e., the inboard surface of the sheet, has a protective laceration inhibiting shield bonded thereto. This shield comprised a three layer composite sheet including a first layer of high adhesion polyvinyl butyral 0.015 inch in thickness bonded to the glass, a second layer of flame treated polyester ("Mylar") 0.004 inch in thickness, and an abrasion resistant coating on the exposed surface of the polyester made from silica-reinforced methyl-siloxane. The abrasion resistant coating had been removed from the peripheral marginal area of the shield adapted to contact the encapsulating gasket.

The assembly is appropriately positioned on the lower mold 22, after which the upper mold 26 is mated with the lower mold 22, and the two are clamped together. A charge composed of one part by weight of a polyol composition and 0.63 part by weight of an isocyanate is then forced into a mixing head under a pressure of about 2,500 psi and from thence into the mold 20 at a pressure of about 50 psi. The polyol and isocyanate streams are maintained at a temperature of about 100° F., while the mold 22 is maintained at a temperature of about 145° F. The polyol and isocyanate streams are thoroughly mixed before they reach the mold. Approximately one and one-half minutes after the urethane composition is injected therein, the mold 20 may be opened, and the assembly 10 removed therefrom.

The resulting elastomeric gasket is microcellular, and has a specific gravity of 1.07 g/cc; a hardness (Shore "A") of 90; a tensile strength of 1500 psi; a percent elongation of 279; and a flexural modulus (at 75° F.) of approximately 3500.

The polyol composition used in carrying out the procedure described in the foregoing example is typically composed of 100 pounds of a base polyol, namely a 6000 molecular weight polyether triol with ethylene oxide "capping", sold under the trademark "Voranol" 5815 by the Dow Chemical Company; 10 pounds of ethylene glycol; and 3 pounds of 20% carbon black in polyol.

The isocyanate used in practicing the procedure of the foregoing example is a modified 4,4' diphenyl methane diisocyanate sold under the trademark Rubinate LF 179 by the Rubicon Chemicals Co.

The above constituents are catalyzed by the addition of dibutyl tin dilaurate, and a solution of triethylenediamine in dipropylene glycol.

While the preferred embodiment of the invention utilizes a composition of polyurethane to achieve the desired results, other compositions of nylons, polyesters, and epoxies may be suitably utilized as the gasket forming material.

We claim:

1. A glazing, including a glass substrate having adhered to a major surface thereof a layer of plastic material, said plastic material having an exposed surface and being effective to provide increased anti-lacerative properties to the glass sheet when the glazing is impacted and the glass sheet broken, and a gasket extending about a major portion of the periphery of the glazing and adhered to the adjacent marginal edge surfaces of both the glass substrate and plastic layer, said gasket having been polymerized in situ adjacent said edge surfaces and having assumed through the autogenous mechanism incident to its polymerization and cure while confined intimate contact with said surfaces.

2. A glazing as defined in claim 1, wherein said gasket extends completely around the periphery of the glazing.

3. A glazing as defined in claim 1, wherein said exposed surface of said plastic layer has an abrasion resistant coating applied thereto.

4. A glazing as defined in claim 1, wherein said glass substrate is composed of a single glass sheet.

5. A glazing as defined in claim 1, wherein said substrate is composed of a plurality of glass sheets laminated together through an interposed adhesive material.

6. A glazing as defined in claim 4, wherein said glass sheet is tempered.

7. A glazing as defined in claim 4, wherein said glass sheet is heat strengthened.

8. A glazing as defined in claim 1, wherein said gasket is formed of an elastomeric material.

9. A glazing as defined in claim 1, wherein said gasket is composed of polyurethane.

10. A glazing as defined in claim 1, wherein said gasket is comprised of a microcellular polyurethane elastomer.

11. A glazing as defined in claim 1, wherein said layer of plastic material includes a thickness of polyvinyl butyral one surface of which is adhered to said major surface of glass, and a thickness of polyester adhered to the other surface of said polyvinyl butyral.

12. A glazing as defined in claim 11, wherein an abrasion resistant coating made from silica-reinforced methyl-siloxane is applied to the free surface of said thickness of polyester.

13. A glazing as defined in claim 12, wherein said gasket is comprised of a microcellular polyurethane elastomer.

14. A glazing, including at least one sheet of glass having adhered to a major surface thereof a layer of plastic material, said plastic material having an exposed surface and being effective to provide increased anti-lacerative properties to the glass sheet when the glazing is impacted and the glass sheet broken, and a gasket extending about a major portion of the periphery of the glazing and adhered to the adjacent marginal edge surfaces of both the glass and plastic layer, said gasket having been polymerized in situ adjacent said edge surfaces and having assumed through the autogenous mechanism incident to its polymerization and cure while confined intimate contact with said surfaces.

15. A glazing as defined in claim 14, wherein said gasket extends completely around the periphery of the glazing.

16. A glazing product for use in closing an opening in a structure, comprising a main body of an optically transparent sheet of glazing material, a layer of transparent plastic material adhered in superimposed and coextensive relation to at least one surface of said sheet of glazing material and a gasket formed in situ about the peripheral marginal edges of said main body and said layer and adhesively secured thereto.

17. A method of producing an anti-lacerative glazing product including a glass sheet and a gasket adhered to the periphery thereof, said method including the steps of:

assembling into a superimposed stacked arrangement a glass substrate sheet and a plastic anti-lacerative sheet;

laminating said plastic sheet to said glass sheet to form an integral assembly;

positioning said integral assembly within the interior of a mold cavity formed by a plurality of cooperating die sections, said mold cavity having the shape and position, relative to said integral assembly, of the ultimate gasket, and enclosing the marginal surfaces of the assembly immediately adjacent the periphery thereof;

injecting into the mold cavity a composition which is capable of polymerization and cure to produce a gasket and, when cured in contact therewith, adheres to the marginal surfaces of the integral laminated assembly;

controlling the pressure at which the composition is injected into the mold cavity to one sufficiently low that the glass substrate sheet and plastic anti-lacerative sheet are not damaged;

controlling the temperature of the mold cavity, the injection of the composition and the amount of the composition injected so that the composition polymerizes after its injection and assumes by the autogenous mechanism incident to polymerization intimate contact with the mold cavity and with the sheets of said integral assembly, and cures while in such contact; and removing the resulting encapsulated anti-lacerative glazing product from the mold cavity.

* * * * *